Figure 1:
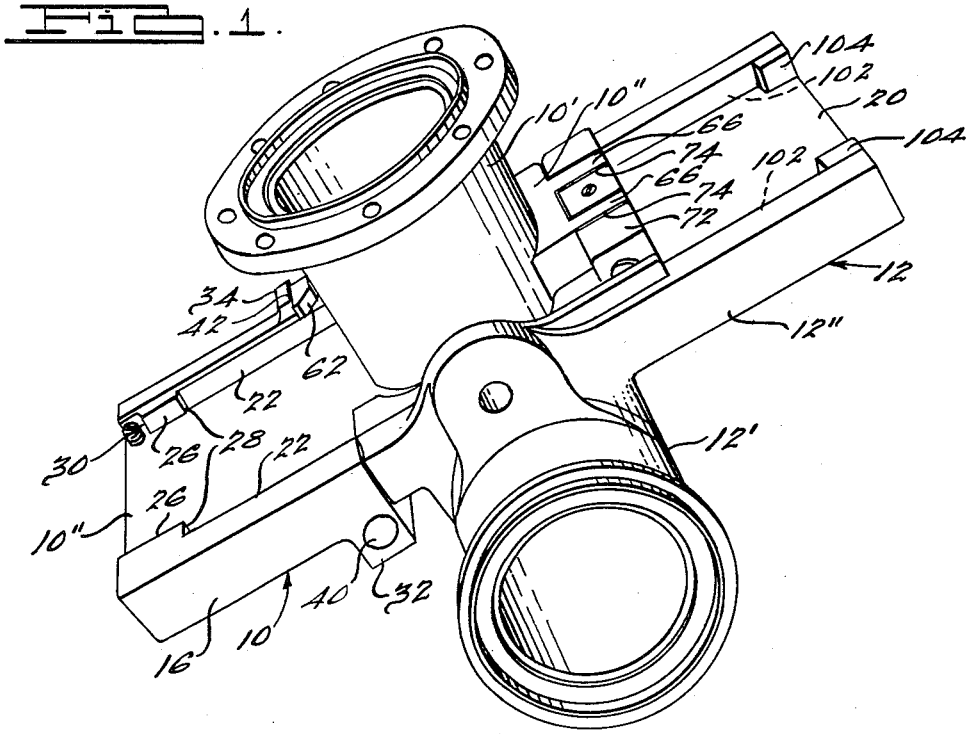

Aug. 31, 1954 S. H. ZEEB 2,687,903
COUPLING WITH SLIDING VALVES AND LOCKING KEYS
Filed Dec. 22, 1952 3 Sheets-Sheet 1

INVENTOR.
Stanley H. Zeeb.
BY
*signature*
ATTORNEY.

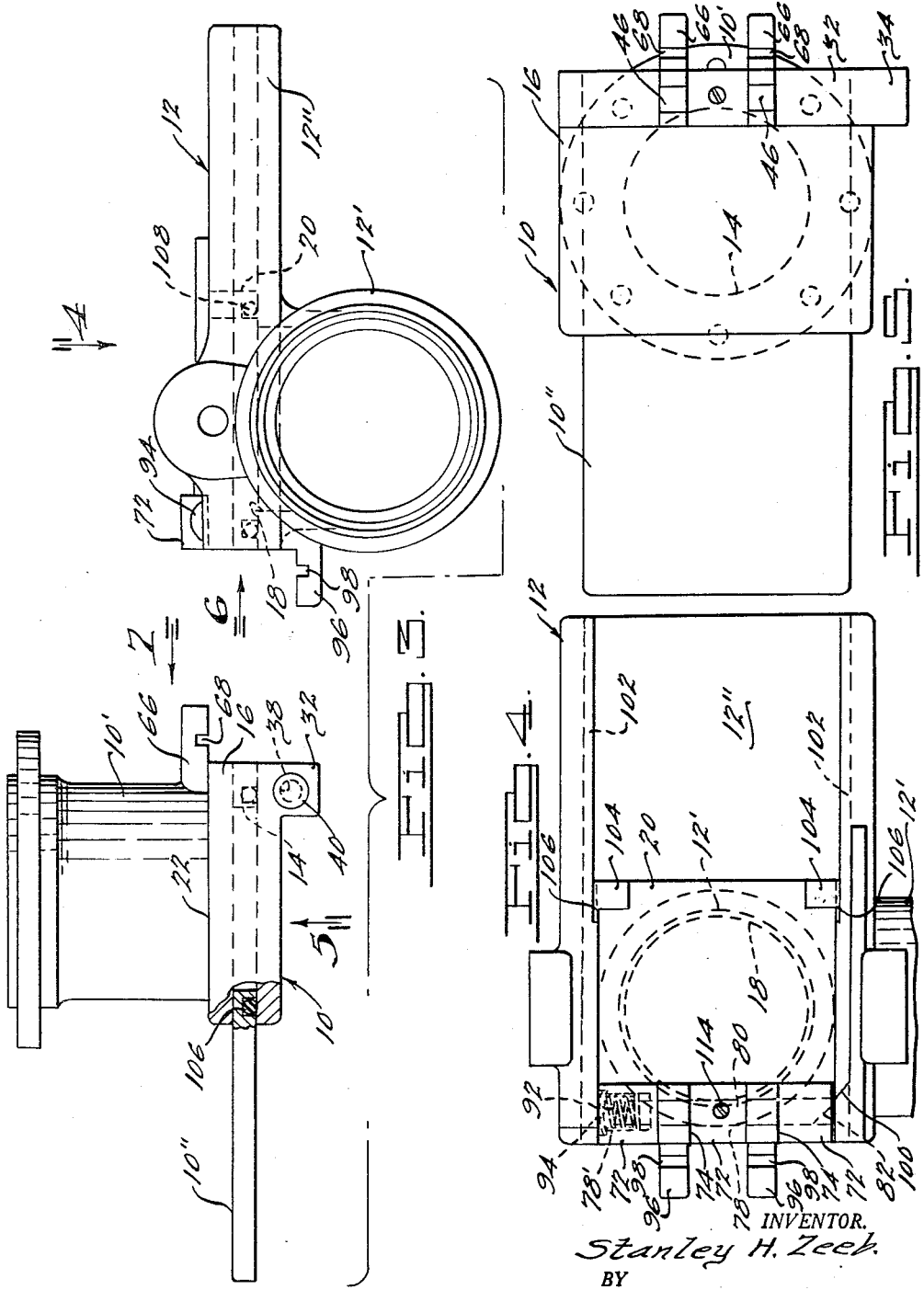

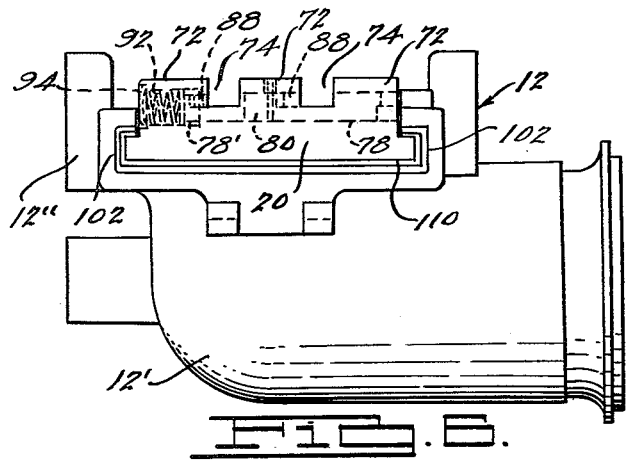
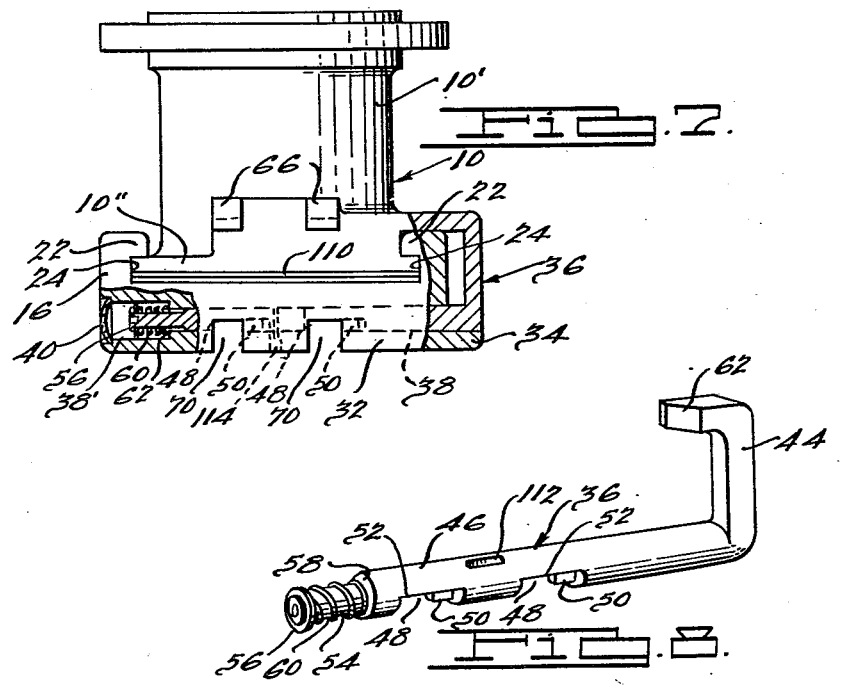
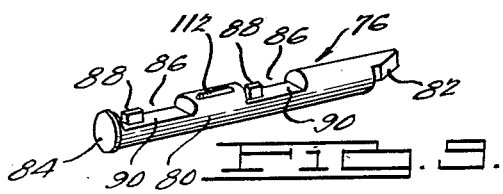

Patented Aug. 31, 1954

2,687,903

UNITED STATES PATENT OFFICE 2,687,903

COUPLING WITH SLIDING VALVES AND LOCKING KEYS

Stanley H. Zeeb, Jackson, Mich., assignor to Aeroquip Corporation, Jackson, Mich., a corporation of Michigan Application December 22, 1952, Serial No. 327,199

3 Claims. (Cl. 284—4)

1

This invention relates to disconnectable couplings for inter-connecting conduits for the flow of fluid and of the kind which comprise a pair of body parts having fluid flow openings and carrying slidable closure members for closing the openings when the body parts are disconnected. In particular, the invention is concerned with couplings of this kind in which the connection and disconnection of the body parts is effected by a rectilinear pushing together and pulling apart displacement of the body parts in order to connect and disconnect the body parts, respectively.

According to a known coupling of the above kind, as disclosed in the prior Patent No. 2,500,347 granted March 14, 1950, William R. McKay, rectilinear displacement of the body parts to connect and disconnect them, with an attendant opening and closing of slidable closure members for the fluid flow openings in the body parts, necessitated rectilinear displacement of the body parts in two planes, it being necessary to move the coupling parts first in one plane so as to inter-engage or disengage the parts and then to move the parts in a plane perpendicular to said first mentioned plane in order to effect the pushing together or pulling apart movements.

When installing this known coupling construction for use, therefore, it is necessary that space should be available in which the required two-plane movement can take place in order to connect and disconnect the coupling parts.

Recent requirements, however, have been for couplings which are so closely grouped together, or which require to be located in such a confined space, that there has been a demand for a coupling which is capable of being connected and disconnected in the smallest possible space.

It is an important object of the invention, therefore, to provide an improved coupling of the above kind with which the connection and disconnection of the coupling body parts, with attendant opening and closing of the valve plates, is capable of being effected by rectilinear displacement of the body parts in a single plane.

It is a further object of the invention to provide a sliding plate valve type coupling in which the valve plates are automatically slid into their open and closed positions consequent upon the body parts being subjected to rectilinear pushing together and pulling apart displacement applied in a single direction or plane.

The above and further objects and advantages of the invention, residing in the construction, combination and arrangement of parts will

2 appear clear from consideration of the following detail description of one practical embodiment of the invention, with reference to the accompanying drawings, and from the appended claims.

Figure 2:
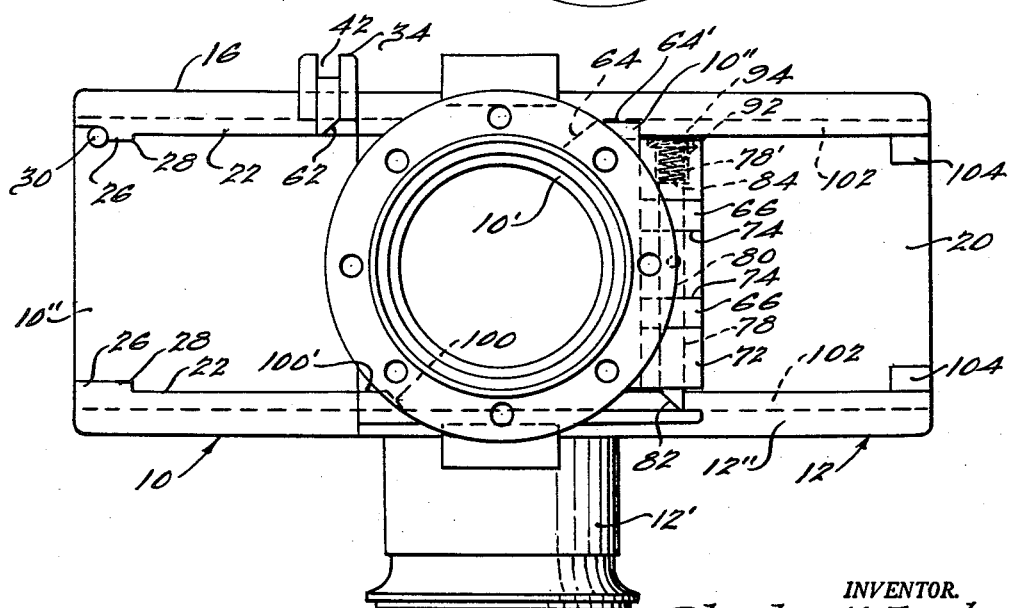

In the drawings,

Fig. 1 is a perspective plan view of said one embodiment of the invention, with the two coupling body parts connected and the closure valve plate members in open position, Fig. 2 is a top plan view of Fig. 1, Fig. 3 is a side elevational view of Fig. 2, showing the two coupling body parts disconnected but in position for connection, the closure valve plate members being now in their closed positions and a portion of the left-hand coupling part being in broken-away section, Fig. 4 is a top plan view of the right-hand coupling part as seen in Fig. 3, Fig. 5 is an underneath plan view of the left-hand coupling part as seen in Fig. 3, Fig. 6 is a view looking on the left end of the right hand coupling part, as seen in Fig. 3, Fig. 7 is a view looking on the right end of the left-hand coupling part as seen in Fig. 3, and Figs. 8 and 9 are detail perspective views of the locking keys employed in this embodiment of the invention.

Referring to the drawings, 10 and 12 indicate, generally, the two coupling body parts, each having a hollow boss 10', 12' extending from a substantially rectangular body part 10'', 12'' integral with the bosses 10' and 12', respectively.

The body part 10 has a fluid flow opening 14 in open communication with the boss 10' and having an associated rectilinearly slidable closure member 16.

The body part 12 also has a fluid flow opening 18 in open communication with the boss 12' and having an associated rectilinearly slidable closure member 20.

The closure member 16 is in the form of a rectangular imperforate plate of channel section (Fig. 7) presenting inturned opposed side flanges 22 and channels 24 by which this closure member is guided for rectilinear sliding movement upon the body part 10''.

The flanges 22 are enlarged at one end, as indicated at 26, in Figs. 1 and 2, to provide shoulders 28 which are capable of striking against the boss 10' to limit movement of the closure member 16 when the same is slid to close the port 14 in the body part 10''. A pin 30 on this body, by engagement with one of the flange portions 26, limits movement of the closure member 16 in the opposite direction, corresponding to the fully open position thereof with respect to the opening 14.

At one end, adjacent the boss 10', the closure member 16 is formed with a depending flange 32, which is itself extended at one end, as indicated at 34. Mounted within this flange 32 there is a locking key, indicated generally at 36 (Fig. 8). This key extends transversely within a bore 38, 38' in the flange 32, which is closed at one end by a cap 40 and, at its opposite end, extends into a channel 42 (Figs. 1 and 2) formed in the extended flange end 34. This channel 42 is formed so as slidably to accommodate a crank-like arm 44 of rectangular section formed at one end of the locking key 36, which key comprises a round section rod-like portion 46 formed with axially spaced transverse channels 48 in which axially aligned fingers 50 are located, these fingers extending centrally from the flat surfaces 52 defined across the rod portion 46 by the presence of the transverse channels 48. A reduced end portion 54 of the rod portion 46 has an end collar, or washer, 56 between which and the shoulder 58, a coil spring 60 is mounted. When the key is mounted in the bore 38 this spring engages between the collar 56 and a shoulder 62 formed by the enlarged end bore portion 38' (Fig. 7). When so mounted, the locking key is slidable within the bore 38, 38' in one direction under the control of the spring 60 and, in the opposite direction, under the control of cam means 62 and 64 formed as inter-engageable bevelled surfaces on the arm 44 and the body part 10'', respectively. The bevelled cam surface 64 is formed on the end portion of the body part 10'' seen to the right of Fig. 2, where this body part is formed with a pair of transversely spaced parallel fingers 66 having axially aligned channel slots 68 (Figs. 3 and 5). The bevelled cam surface 64 is followed by a straight edge portion 64' of the body part 10''.

Returning to the locking key 36, it is to be noted that the fingers 50 thereon are projectable across a pair of transversely spaced parallel channels 70 formed across the flange 32 at one end of the slidable closure member 16.

Referring now to the coupling part 12, the closure member 20 is in the form of a rectangular imperforate plate having an upstanding flange 72 at one end (as seen in the drawings) formed with transversely spaced parallel channels 74 (Figs. 1, 4, 5 and 6) adapted slidably to receive the fingers 66 on the body part 10.

Mounted for transverse sliding movement in the said flange 72 there is a locking key, indicated generally at 76 in Fig. 9. This key is mounted in a bore 78, 78' in the flange 72 and comprises a rod-like portion 80, with a bevelled cam surface 82 at one end and a collar 84 at the opposite end. The rod portion 80 is also formed with axially spaced transverse channels 86 in which axially aligned fingers 88 are located, these fingers extending centrally from the flat surfaces 90 defined on the rod portion 80 by the channels 86. The locking key 76 is spring mounted within the bore 78, 78' by a coil spring 92 located in the enlarged bore portion 78' and retained between the end collar 84 and an end cap 94 closing the corresponding end of the bore portion 78'.

The body part 12'' of the coupling part 12 is formed with a pair of transversely spaced parallel fingers 96 having axially aligned channel slots 98 (Figs. 3 and 5).

The locking key 76 is slidably mounted within the bore 78, 78' under the control of the spring 92, in one direction, and under the control of the bevel cam surface 82 and a companion bevel cam surface 100 (Figs. 2 and 4) in the opposite direction. The bevelled cam surface 100 is formed at one end of a guide channel 102 in which the closure member 20 is slidably mounted, and is followed by a straight edge surface 100' (Fig. 2). Stops 104 on the closure member 20, by engagement with shoulders 106 along the channels 102, limit the sliding movement of this closure member in the direction in which it closes the fluid flow opening 18 in the body part 12''.

The construction and arrangement is such that the fingers 66 can be engaged in the channels 74, at the same time as the fingers 96 are engaged in the channels 70, by a simple rectilinear movement of the coupling body parts 10 and 12 towards each other in one plane from the position as seen in Fig. 3. When the fingers are so engaged in their respective channels, the slots 68 are aligned with the fingers 50 of the locking key 36. At the same time, the slots 98 are aligned with the fingers 88 of the locking key 80.

In the disconnected condition of the coupling parts 10 and 12, the closure members 16 and 20 are in position where they close their respective body part fluid openings 14 and 18 and the locking keys are displaced inwards against the action of their springs 60 and 92 due to the action of their respective cam surfaces 62, 64, 82, 100 and the engagement of the ends of the locking keys 36 and 76 having the bevelled cam surfaces 62 and 82, respectively, with the aforesaid straight edges 64' and 100' on the body parts 10'' and 12'', respectively. In this position, the fingers 50 and 88 on the locking keys 36 and 76, respectively, will be located clear of the channels 70 and 72, respectively, as seen in Figs. 6 and 7.

Upon connecting the coupling body parts 10 and 12, positioned as seen in Fig. 3, and with the fingers 66 and 96 engaged in the channels 70 and 74, respectively, continued rectilinear movement will cause the closure members 16 and 20 to be pushed in opposite directions with respect to their body parts 10'' and 12''. Simultaneously with this movement, the ends of the locking keys 36 and 76 having the bevelled cam surfaces 62 and 82 will be brought from the straight edges 64' and 100' to their respective bevelled cam surfaces 64 and 100 on the body parts 10'' and 12''. Immediately this happens the compressed springs 60 and 92 project the locking keys within their bores 38, 38' and 78, 78' and thus enter the fingers 50 on the key 36 in the slots 68 of the fingers 66 at the same time as the fingers 88 on the key 76 enter into engagement with the slots 98 on the fingers 96. It will be appreciated, therefore, that the closure member 16 on the body part 10'' will then be connected by the key fingers 50 for unitary rectilinear movement with the fingers 96 on the other body part 12'', whereas the closure member 20 on the body part 12'' will be connected by the key fingers 88 for unitary rectilinear movement with the fingers 66 on the body 10''. Thus, continued pushing movement will cause the closure members to be pushed into the opened positions, in which the openings 14 and 18 are in register. When so registered, a sealing ring 106 on the body part 10'' seals the registered openings 14 and 18 with respect to the body part 10'' and 12''. A sealing ring 108 on the closure member 20 seals the opening 18 with respect to the body part 12'' in the disconnected condition of the coupling part 12. The sealing ring 106 seals the opening 14 with respect to the closure member 16 in the disconnected condition of the coupling part 12.

The reverse action will take place when the coupled parts are pulled apart for disconnection. When this occurs, the closure members will be pulled into their closed positions due to the connecting action of the key fingers 50 and 88. Towards the end of this movement, the bevelled cam surfaces 62 and 82 on the still projected locking keys will be brought into engagement with their respective bevelled cam surfaces 64 and 100 on the body parts 10'' and 12''. Thus, this pulling apart movement will be terminated by the locking keys being displaced against the action of their springs and the closure members being automatically closed, with the bevel surfaced ends of the locking keys held against the straight edge surfaces 64' and 100'.

In Figs. 6 and 7, 110 indicates strip packings for sealing against the opposed ends of the connected coupling parts.

112, in Figs. 8 and 9, indicates elongated slots in the locking keys with which screws 114 (Figs. 5 and 7) engage to constrain the locking keys to partake of their desired axial movement and prevent rotation thereof.

Having thus described my invention, what I claim as novel and wish to secure by Letters Patent is as follows:

1. In a separate coupling, a pair of body parts, each said body part including a rectilinear part and a hollow boss, each said rectilinear part having a flat surface with an opening therein in communication with its corresponding hollow boss, a pair of rectilinear closure plate members for said openings, means mounting a said closure plate closure member upon each said rectilinear part for rectilinear sliding movement thereon, rectilinearly extending means upon each said closure plate member, said rectilinearly extending means extending in the same plane as said rectilinear parts and the rectilinearly extending means on each boss being engaged with the rectilinearly extending means on the closure plate member of the other body part, and rectilinearly extending means inter-connecting said engaged means to produce positive movement of said closure plate members to open or close said openings incidental to relative displacement of said body parts in said one rectilinear direction.

2. A separable coupling as claimed in claim 1, said engaged means comprising transversely spaced fingers and slots on said bosses and said closure plate members and said interconnecting means comprising releasable key means extending transversely through said engaged fingers and slots.

3. A separable coupling as claimed in claim 1, said engaged means comprising transversely spaced fingers and slots on said bosses and said closure plate members and said interconnecting means comprising releasable key means extending transversely through said engaged fingers and slots, said rectilinear parts having cam surfaces and said key means including springs urging end portions of said key means into the path of said cam surfaces, whereby engagement of said cam surfaces with said end portions moves the key means to release position to permit disconnection of the said inter-connected closure plate members and rectilinear parts incidental to said relative displacement of the coupling parts.

References Cited in the file of this patent

UNITED STATES PATENTS

| Number | Name | Date |
| --- | --- | --- |
| 1,215,481 | Cantin | Feb. 13, 1917 |
| 1,365,776 | Elmen | Jan. 18, 1921 |
| 2,403,620 | Snyder | July 9, 1946 |
| 2,500,847 | McKay | Mar. 14, 1950 |